United States Patent
Lim et al.

(10) Patent No.: US 10,152,127 B2
(45) Date of Patent: Dec. 11, 2018

(54) APPARATUS AND METHOD FOR CONTROLLING VIBRATION TRANSFER BETWEEN VIBRATION DEVICES

(71) Applicant: SAMSUNG ELECTRONICS CO., LTD., Suwon-si (KR)

(72) Inventors: Soo Chul Lim, Seoul (KR); Joonah Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/245,284

(22) Filed: Aug. 24, 2016

(65) Prior Publication Data

US 2017/0052592 A1 Feb. 23, 2017

Related U.S. Application Data

(63) Continuation of application No. 13/616,820, filed on Sep. 14, 2012, now Pat. No. 9,448,627.

(30) Foreign Application Priority Data

Feb. 10, 2012 (KR) .......................... 10-2012-0013775

(51) Int. Cl.
*A63F 9/24* (2006.01)
*G06F 3/01* (2006.01)

(52) U.S. Cl.
CPC .............. *G06F 3/016* (2013.01); *G06F 3/011* (2013.01); *G06F 3/014* (2013.01); *G06F 2203/014* (2013.01)

(58) Field of Classification Search
None
See application file for complete search history.

(56) References Cited

U.S. PATENT DOCUMENTS

| 6,219,032 | B1 | 4/2001 | Rosenberg et al. |
| 9,457,281 | B1* | 10/2016 | Lam .................... A63H 33/00 |
| 2002/0021283 | A1* | 2/2002 | Rosenberg .............. A63F 13/10 |
| | | | 345/156 |
| 2006/0142657 | A1 | 6/2006 | Quaid et al. |
| 2009/0069081 | A1* | 3/2009 | Thorner .................. G06F 3/011 |
| | | | 463/30 |
| 2010/0004033 | A1 | 1/2010 | Choe et al. |

(Continued)

FOREIGN PATENT DOCUMENTS

| CN | 101910978 A | 12/2010 |
| CN | 102111496 A | 6/2011 |

(Continued)

OTHER PUBLICATIONS

Alvaro Cassinelli et al., "Augmenting spatial awareness with Haptic Radar", IEEE 10th International Symposium, 2006, 4 pages.
(Continued)

*Primary Examiner* — Joseph Feild
*Assistant Examiner* — John Mortell
(74) *Attorney, Agent, or Firm* — NSIP Law

(57) ABSTRACT

Provided is an apparatus and method for controlling a vibration transfer between vibration devices. The apparatus for controlling a vibration transfer may change vibration values of a plurality of vibration devices according to a movement of a virtual vibration body, thereby providing a user with a sense of touch of a movement of the virtual vibration body.

17 Claims, 18 Drawing Sheets

(56) References Cited

U.S. PATENT DOCUMENTS

2011/0018697 A1  1/2011  Birnbaum
2011/0025479 A1* 2/2011  Hwang ................ B06B 1/0207
                                                340/407.1

FOREIGN PATENT DOCUMENTS

| EP | 2339427 A2 | 6/2011 |
|----|---|---|
| JP | 2003-199974 A | 7/2003 |
| JP | 2008-122644 A | 5/2008 |
| JP | 2008-262478 A | 10/2008 |
| JP | 2009-532808 A | 9/2009 |
| JP | 2009-294844 A | 12/2009 |
| JP | 2011-090575 A | 5/2011 |
| JP | 2011-183374 A | 9/2011 |
| KR | 10-2008-0079966 A | 9/2008 |
| KR | 10-2010-0067587 A | 6/2010 |
| KR | 10-0970574 B1 | 7/2010 |
| KR | 10-2010-0089018 A | 8/2010 |
| KR | 10-2010-0126154 A | 12/2010 |
| KR | 10-2011-0110082 A | 10/2011 |
| KR | 10-2011-0123564 A | 11/2011 |
| WO | WO 97/20305 A1 | 6/1997 |
| WO | WO 2007/117649 A2 | 10/2007 |
| WO | WO 2011/052484 A1 | 5/2011 |
| WO | WO 2012/001587 A1 | 1/2012 |

OTHER PUBLICATIONS

Extended European Search Report dated Jun. 19, 2013 in European Patent Application No. 13153530.4.

Chinese Office Action dated Nov. 9, 2016 in corresponding Chinese Patent Application No. 201310013867.6 (36 pages with English translation).

Japanese Patent Office on Nov. 22, 2016 for the corresponding JP Patent Application No. 2013-20761.

Japanese Office Action dated May 16, 2017 in corresponding Japanese Patent Application No. 2013-020761 (5 pages with English translation).

* cited by examiner

APPARATUS AND METHOD FOR CONTROLLING VIBRATION TRANSFER BETWEEN VIBRATION DEVICES

CROSS-REFERENCE TO RELATED APPLICATIONS

This application is a Continuation of U.S. patent application Ser. No. 13/616,820 filed on Sep. 14, 2012, which claims benefit under 35 U.S.C. § 119(a) of Korean Patent Application No. 10-2012-0013775 filed Feb. 10, 2012, in the Korean Intellectual Property Office, the contents of all of which are incorporated herein by reference in their entireties.

BACKGROUND

1. Field

Embodiments relate to an apparatus and method for controlling a vibration transfer among a plurality of devices, and more particularly, to an apparatus and method for providing a user with a sense of movement of a virtual vibration body.

2. Description of the Related Art

A technology for delivering additional information to a user by adding a Haptic feedback based on a vibration to an interface is being developed.

A conventional vibration device may allow a user to strongly perceive a variation by providing, through a vibration, the user with information on whether a variation occurs, for example, whether a message is received or an event occurs.

However, when a user moves a virtual object or content, a sense associated with a movement of the virtual object or the content may not be provided to the user.

Accordingly, there is a desire for a method of providing, through a vibration, a user with a sense of movement of a virtual object or content by controlling a plurality of vibration devices.

SUMMARY

According to an aspect of one or more embodiments, there is provided an apparatus for controlling a vibration transfer, the apparatus including a vibration value determining unit (vibration value determiner) to determine vibration values of a plurality of vibration devices according to a direction of a movement of a virtual vibration body corresponding to a vibration source, and a vibration device controller to control the plurality of vibration devices according to the determined vibration values, thereby providing a user with a sense of movement of the virtual vibration body.

The vibration value determining unit may determine vibration values of vibration devices corresponding to the direction of the movement of the virtual vibration body, and vibration values of vibration devices corresponding to a direction opposite to the direction of the movement of the virtual vibration body.

The vibration value determining unit may increase a vibration magnitude among vibration values of a vibration device corresponding to the direction of the movement of the virtual vibration body, and decrease a vibration magnitude among vibration values of a vibration device corresponding to the direction opposite to the direction of the movement.

The vibration value determining unit may determine, based on a velocity of movement of the virtual vibration body, variation velocities of a vibration value of a vibration device corresponding to the direction of the movement of the virtual vibration body and a vibration value of a vibration device corresponding to the direction opposite to the direction of the movement of the virtual vibration body.

According to an aspect of one or more embodiments, there is provided an apparatus for controlling a vibration transfer, the apparatus including a vibration value determining unit to determine vibration values of vibration devices placed in a first area to be different from vibration values of vibration devices placed in a second area located opposite to the first area when a virtual vibration body is located between the vibration devices placed in the first area and the vibration devices placed in the second area, and a vibration device controller to control vibration devices based on the determined vibration values.

The apparatus may further include a virtual vibration body controller to control the virtual vibration body to periodically move between the first area and the second area, wherein the vibration value determining unit determines, based on the control of the virtual vibration body, the vibration values of the vibration devices placed in the first area and the vibration values of the vibration devices placed in the second area.

The vibration value determining unit may determine a vibration magnitude and a vibration frequency among the vibration values of the vibration devices placed in the first area to be the same as the vibration values of the vibration devices placed in the second area, and determine a vibration timing among the vibration values of the vibration devices placed in the first area to be different from the vibration values of the vibration devices placed in the second area.

According to an aspect of one or more embodiments, there is provided a method of controlling a vibration transfer, the method including determining vibration values of a plurality of vibration devices according to a direction of a movement of a virtual vibration body corresponding to a vibration source, and controlling the plurality of vibration devices according to the determined vibration values, thereby providing a user with a sense of movement of the virtual vibration body.

According to an aspect of one or more embodiments, there is provided a method of controlling a vibration transfer, the method including determining vibration values of vibration devices placed in a first area to be different from vibration values of vibration devices placed in a second area located opposite to the first area when a virtual vibration body is located between the vibration devices placed in the first area and the vibration devices placed in the second area, and controlling vibration devices based on the determined vibration values.

According to embodiments, it is possible to provide a user with a sense of movement of a virtual vibration body by changing vibration values of a plurality of vibration devices according to a movement of the virtual vibration body.

According to embodiments, it is possible to provide a user with a sense of touch providing the user with a sensation that a virtual vibration body is located between vibration devices by changing vibration values of the vibration devices when the virtual vibration body is located between the vibration devices.

According to an aspect of one or more embodiments, there is provided an apparatus for controlling a vibration transfer including a location identifier to identify location of a virtual vibration body, a direction of movement of the virtual vibration body, and locations of a plurality of vibration devices using at least one processor; and a vibration device controller to control the plurality of vibration devices according to vibration values to provide a user with a sense of movement of the virtual vibration body.

An apparatus for controlling a vibration transfer may include a vibration value determiner to determine the vibration values of the plurality of vibration devices according to the direction of the movement of the virtual vibration body.

According to an aspect of one or more embodiments, there is provided a method of controlling a vibration transfer, the method including identifying a location of the virtual vibration body, a direction of movement of the virtual vibration body, and locations of a plurality of vibration devices using at least one processor; and controlling the plurality of vibration devices according to vibration values to provide a user with a sense of movement of the virtual vibration body.

A method of controlling a vibration transfer may include determining the vibration values of the plurality of vibration devices according to the direction of the movement of the virtual vibration body.

According to an aspect of one or more embodiments, there is provided at least one non-transitory computer readable medium storing computer readable instructions to implement methods of embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
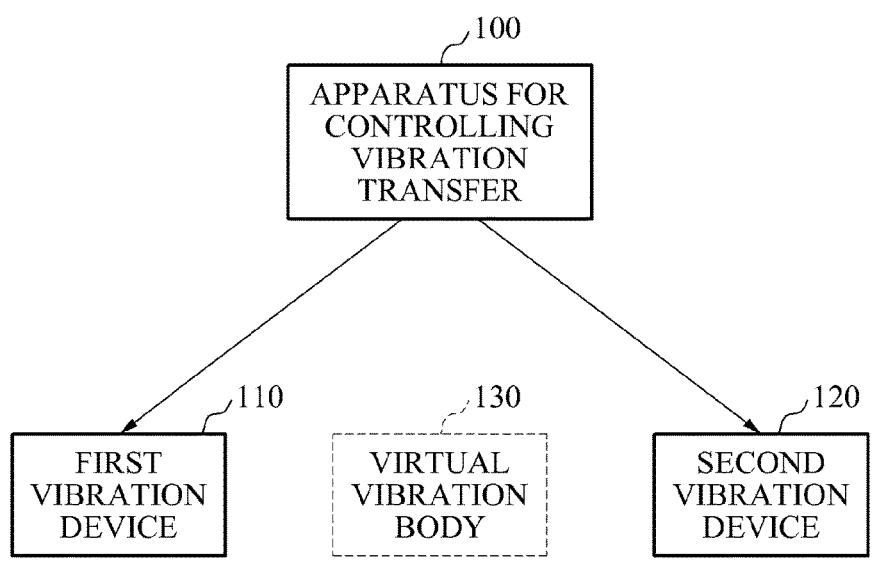
FIG. 1 illustrates an overall system configuration according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an overall system configuration according to an embodiment.

Referring to FIG. 1, an apparatus for controlling a vibration transfer 100 may provide a user with a sense of movement of a virtual vibration body 130 by controlling a first vibration device 110 and a second vibration device 120. In this instance, the first vibration device 110 and the second vibration device 120 may correspond to devices generating a vibration, and may change at least one of a vibration magnitude, a frequency, a vibration acceleration, and a vibration timing according to a vibration value determined by the apparatus for controlling a vibration transfer 100.

In this instance, the virtual vibration body 130 may correspond to a vibration source of a vibration provided to a user using the first vibration device 110 and the second vibration device 120. In particular, the virtual vibration body 130 may correspond to a virtual vibration body, a virtual object in a virtual reality, and content manipulated by a user.

For example, when a user generates a vibration flow moving from a left hand to a right hand by shaking the left hand to a right hand side while holding the first vibration device 110 and the second vibration device 120 in both hands, the apparatus for controlling a vibration transfer 100 may determine that the virtual vibration body 130 corresponding to a vibration source moves from the left hand to the right hand, and provide the user with a sense of movement of the virtual vibration body 130 from the left hand to the right hand by controlling the first vibration device 110 and the second vibration device 120. In particular, the apparatus for controlling a vibration transfer 100 may provide the user with a sense of movement of the virtual vibration body 130 from the left hand to the right hand by decreasing a vibration of the first vibration device 110 held by the user in the left hand since a distance to the virtual vibration body 130 increases over time, and increasing a vibration of the second vibration device 120 held by the user in the right hand since a distance to the virtual vibration body 130 decreases over time.

When the user manipulates content using an interface, the apparatus for controlling a vibration transfer 100 may allow the user to sense, through a vibration, a movement of the content by controlling the first vibration device 110 and the second vibration device 120 according to the movement of the content.

When the virtual vibration body 130 is in a stationary state between the first vibration device 110 and the second vibration device 120, the apparatus for controlling a vibration transfer 100 may cause the virtual vibration body 130 to infinitesimally shuttle in a direction of either the first vibration device 110 or the second vibration device 120, thereby providing a user with a sensation that the virtual vibration body 130 is placed between the first vibration device 110 and the second vibration device 120.

Figure 2:
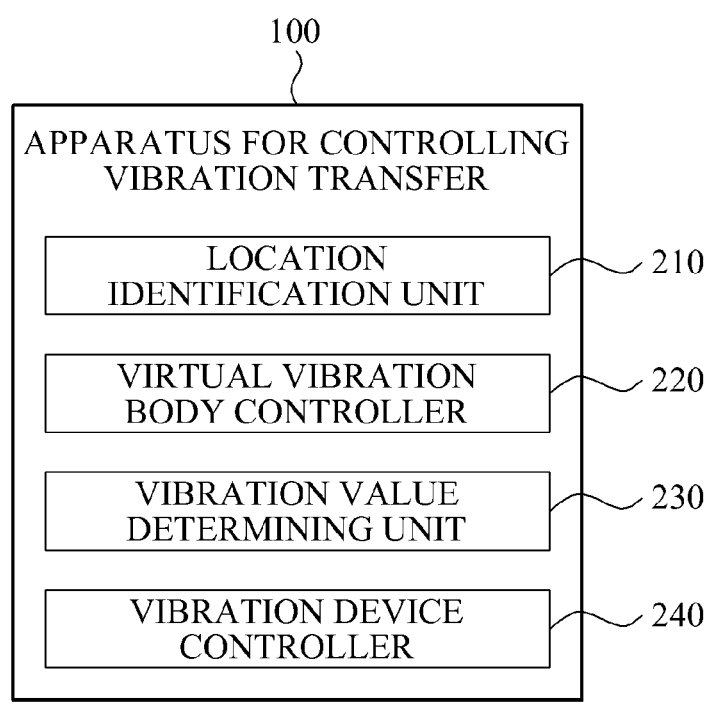
FIG. 2 illustrates a detailed configuration of an apparatus for controlling a vibration transfer according to an embodiment.

FIG. 2 illustrates a detailed configuration of an apparatus for controlling a vibration transfer according to an embodiment.

Referring to FIG. 2, the apparatus for controlling a vibration transfer 100 may include a location identification unit (location identifier) 210, a virtual vibration body controller 220, a vibration value determining unit (vibration value determiner) 230, and a vibration device controller 240.

The location identification unit 210 may identify a location of a virtual vibration body, a direction of a movement of the virtual vibration body, and a location of vibration devices.

The virtual vibration body controller 220 may control a virtual vibration body located between vibration devices placed in a first area and vibration devices placed in a second area located opposite the first area. In particular, when a virtual vibration body is located between vibration devices, the virtual vibration body controller 220 may classify, based on the virtual vibration body, vibration devices into the vibration devices placed in the first area and the vibration devices placed in the second area located opposite to the first area, and periodically shuttle the virtual vibration body between the first area and the second area. An operation of the virtual vibration body controller 220 will be further described with reference to FIGS. 6 and 16.

The vibration value determining unit 230 may determine vibration values of vibration devices according to a direction of a movement of a virtual vibration body corresponding to a vibration source. In this instance, when the virtual vibration body controller 220 controls the virtual vibration body, the vibration value determining unit 230 may determine, based on a control of the virtual vibration body by the virtual vibration body controller 220, vibration values of the vibration devices placed in the first area and vibration values of the vibration devices placed in the second area.

In this instance, the vibration value determining unit 230 may determine vibration values of vibration devices corresponding to the direction of the movement of the virtual vibration body, and vibration values of vibration devices corresponding to a direction opposite to the direction of the movement of the virtual vibration body. Here, the direction of the movement of the virtual vibration body may correspond to a direction in which the virtual vibration body approaches, and the direction opposite to the direction of the movement may correspond to a direction in which the virtual vibration body moves away.

For example, the vibration value determining unit 230 may increase a vibration magnitude among vibration values of vibration devices corresponding to the direction of the movement of the virtual vibration body, and decrease a vibration magnitude among vibration values of vibration devices corresponding to the direction opposite to the direction of the movement.

The vibration value determining unit 230 may increase an amplitude of a frequency among vibration values of the vibration devices corresponding to the direction of the movement of the virtual vibration body, and decrease an amplitude of a frequency among vibration values of the vibration devices corresponding to the direction opposite to the direction of the movement.

The vibration value determining unit 230 may increase a vibration acceleration among vibration values of the vibration devices corresponding to the direction of the movement of the virtual vibration body, and decrease a vibration acceleration among vibration values of the vibration devices corresponding to the direction opposite to the direction of the movement of the virtual vibration body.

The vibration value determining unit 230 may decrease a vibration timing interval among vibration values of the vibration devices corresponding to the direction of the movement of the virtual vibration body, and increase a vibration timing interval among vibration values of the vibration devices corresponding to the a direction opposite to the direction of the movement of the virtual vibration body.

The vibration value determining unit 230 may determine, based on a velocity of movement of the virtual vibration body, variation velocities of vibration values of the vibration devices corresponding to the direction of the movement of the virtual vibration body and vibration values of the vibration devices corresponding to the direction opposite to the direction of the movement of the virtual vibration body.

For example, when the user rapidly moves the virtual vibration body 130, vibration values of the vibration devices corresponding to the direction of the movement of the virtual vibration body may rapidly increase over time, and vibration values of the vibration devices corresponding to the direction opposite to the direction of the movement of the virtual vibration body may rapidly decrease. When the user slowly moves the virtual vibration body 130, vibration values of the vibration devices corresponding to the direction of the movement of the virtual vibration body may slowly increase over time, and vibration values of the vibration devices corresponding to the direction opposite to the direction of the movement of the virtual vibration body may slowly decrease.

The vibration device controller 240 may control a plurality of vibration devices according to a vibration value determined by the vibration value determining unit 230.

Figure 3:
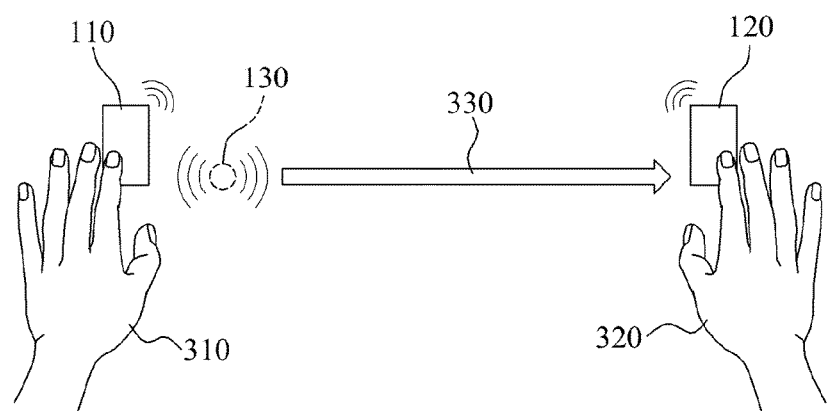
FIG. 3 illustrates an example of a method of controlling a vibration transfer according to an embodiment.

FIG. 3 illustrates an example of a method of controlling a vibration transfer according to an embodiment.

Referring to FIG. 3, a method of controlling a vibration transfer according to an embodiment may correspond to a method of controlling a first vibration device 110 and a second vibration device 120 by an apparatus for controlling a vibration transfer 100 when a virtual vibration body 130 corresponding to a vibration source moves from the first vibration device 110 held by a user in a left hand 310 to the second vibration device 120 held by the user in a right hand 320, as illustrated by arrow 330.

First, when the virtual vibration body 130 is placed relatively close to the first vibration device 110, the apparatus for controlling a vibration transfer 100 may determine a vibration value of the first vibration device 110 to be greater than a vibration value of the second vibration device 120, thereby providing a user with a sensation that the virtual vibration body 130 is placed relatively close to the left hand 310.

Subsequently, when the virtual vibration body 130 moves toward the second vibration device 120 by user manipulation or an application, the apparatus for controlling a vibration transfer 100 may decrease the vibration value of the first vibration device 110, and increase the vibration value of the second vibration device 120, thereby providing a user with a sensation that the virtual vibration body 130 moves from the left hand 310 to the right hand 320.

When the virtual vibration body 130 moves relatively close to the second vibration device 120, the apparatus for controlling a vibration transfer 100 may determine the vibration value of the second vibration device 120 to be greater than the vibration value of the first vibration device 110, thereby providing a user with a sensation that the virtual vibration body 130 is placed relatively close to the right hand 320.

A variation of a vibration value according to a movement of the virtual vibration body 130 will be described with reference to FIGS. 4 and 5.

That is, the apparatus for controlling a vibration transfer 100 according to an embodiment may provide a user with a sensation that the virtual vibration body 130 moves from a location around the left hand 310 to a location around the right hand 320 by changing vibration values of the first vibration device 110 and the second vibration device 120 according to a location of the virtual vibration body 130.

Figure 4:
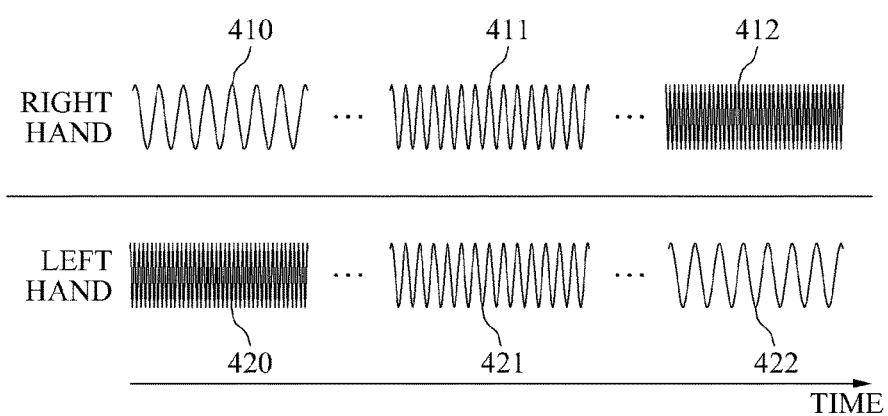
FIG. 4 illustrates an example of a method of transferring a vibration using a vibration frequency according to an embodiment.

FIG. 4 illustrates an example of a method of transferring a vibration using a vibration frequency according to an embodiment.

Referring to FIG. 4, when the virtual vibration body 130 is placed relatively close to the first vibration device 110, the apparatus for controlling a vibration transfer 100 may determine a vibration frequency 410 of the second vibration device 120 and a vibration frequency 420 of the first vibration device 110.

In this instance, since the second vibration device 120 vibrates at the vibration frequency 410 less than the vibration frequency 420 of the first vibration device 110, a user may sense that the virtual vibration body 130 is placed around the first vibration device 110 that vibrates relatively frequently.

Subsequently, when the virtual vibration body 130 moves by a manipulation of a user or an application to be placed between the first vibration device 110 and the second vibration device 120, the apparatus for controlling a vibration transfer 100 may determine a vibration frequency 411 of the second vibration device 120 and a vibration frequency 421 of the first vibration device 110 to be equal to each other as illustrated in FIG. 4.

In this instance, since the first vibration device 110 and the second vibration device 120 vibrate at the vibration frequency 421 and the vibration frequency 411, respectively, equal to each other, the user may sense that the virtual vibration body 130 is placed between the first vibration device 110 and the second vibration device 120.

When the virtual vibration body 130 moves to be relatively close to the second vibration device 120, the apparatus for controlling a vibration transfer 100 may determine a vibration frequency 412 of the second vibration device 120 and a vibration frequency 422 of the first vibration device 110 as illustrated in FIG. 4.

In this instance, since the second vibration device 120 vibrates at the vibration frequency 412 greater than the vibration frequency 422 of the first vibration device 110, a user may sense that the virtual vibration body 130 is placed around the second vibration device 120 that vibrates relatively frequently.

That is, since a vibration frequency of the first vibration device 110 is relatively great at first, and decreases over time, and a vibration frequency of the second vibration device 120 increases over time, the user may sense that the virtual vibration body 130 moves from the first vibration device 110 side towards the second vibration device 120 side.

Figure 5:
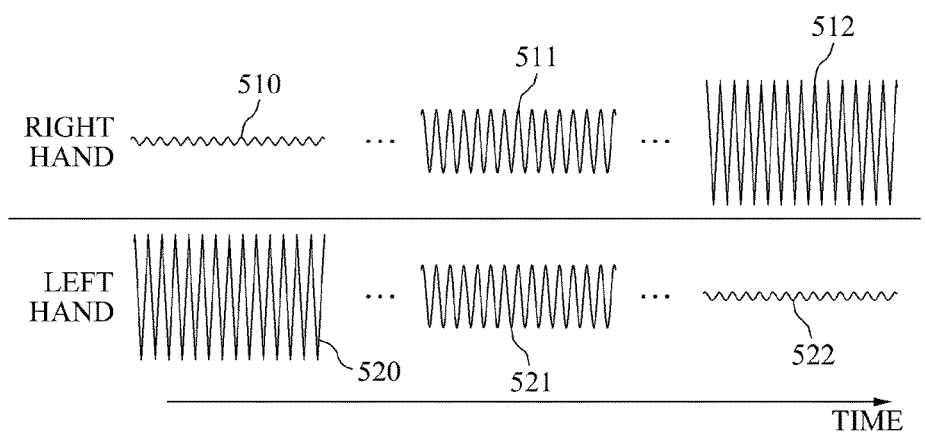
FIG. 5 illustrates an example of a method of transferring a vibration using a vibration magnitude according to an example.

FIG. 5 illustrates an example of a method of transferring a vibration using a vibration magnitude according to an embodiment.

Referring to FIG. 5, when the virtual vibration body 130 is placed relatively closer to the first vibration device 110, the apparatus for controlling a vibration transfer 100 may determine a vibration magnitude 510 of the second vibration device 120 and a vibration magnitude 520 of the first vibration device 110.

In this instance, since the second vibration device 120 vibrates at the vibration magnitude 410 smaller than the vibration magnitude 520 of the first vibration device 110, a user may sense that the virtual vibration body 130 is placed around the first vibration device 110 that vibrates at a relatively great vibration magnitude.

Subsequently, when the virtual vibration body 130 moves by a manipulation of a user or an application to be placed between the first vibration device 110 and the second vibration device 120, the apparatus for controlling a vibration transfer 100 may determine a vibration magnitude 511 of the second vibration device 120 and a vibration magnitude 521 of the first vibration device 110 to be equal to each other as illustrated in FIG. 5. In particular, when an object associated with the virtual vibration body 130 moves by a manipulation of a user or an application, the apparatus for controlling a vibration transfer 100 may move the virtual vibration body 130 according to a movement of the object.

In this instance, since the first vibration device 110 and the second vibration device 120 vibrate at equal magnitudes the vibration magnitude 521 and the vibration magnitude 511, respectively, the user may sense that the virtual vibration body 130 is placed between the first vibration device 110 and the second vibration device 120.

When the virtual vibration body 130 moves to be relatively close to the second vibration device 120, the apparatus for controlling a vibration transfer 100 may determine a vibration magnitude 512 of the second vibration device 120 and a vibration magnitude 522 of the first vibration device 110 as illustrated in FIG. 5.

In this instance, since the second vibration device 120 vibrates at the vibration magnitude 512 greater than the vibration magnitude 522 of the first vibration device 110, a user may sense that the virtual vibration body 130 is placed around the second vibration device 120 that vibrates at a relatively great vibration magnitude.

That is, since a vibration magnitude of the first vibration device 110 is relatively great at first, and decreases over time, and a vibration magnitude of the second vibration device 120 increases over time, the user may sense that the virtual vibration body 130 moves from the first vibration device 110 side toward the second vibration device 120 side.

Figure 6:
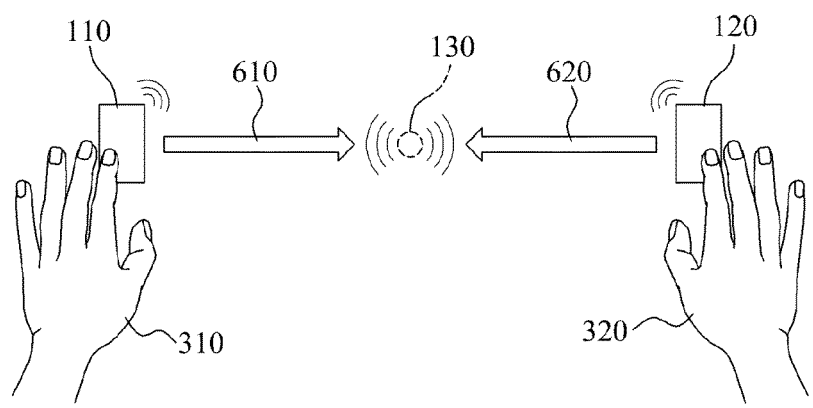
FIG. 6 illustrates an example of a method of controlling a vibration transfer according to another embodiment.

FIG. 6 illustrates an example of a method of controlling a vibration transfer according to an embodiment.

Referring to FIG. 6, a method of controlling a vibration transfer according to an embodiment may correspond to a method of providing, through a vibration, a user with a location of a virtual vibration body 130 corresponding to a vibration source when the virtual vibration body 130 is placed between a first vibration device 110 held by a user in a left hand 310 and a second vibration device 120 held by the user in a right hand 320.

When the virtual vibration body 130 is placed relatively closer to one of the first vibration device 110 and the second vibration device 120, a vibration value of a vibration device relatively close to the virtual vibration body 130 may be increased, thereby providing, through a vibration, the user with the location of the virtual vibration body 130.

However, when the virtual vibration body 130 is placed in a middle of the first vibration device 110 and the second vibration device 120, and a vibration value is determined based on a distance between the virtual vibration body 130 and a vibration device, the same vibration may occur in the first vibration device 110 and the second vibration device 120 and thus, the user may not determine the location of the virtual vibration body 130.

Thus, the apparatus for controlling a vibration transfer 100 according to an embodiment may periodically move the virtual vibration body 130 in a direction 610 toward the second vibration device 120 and in a direction toward the first vibration device 110, and control the first vibration device 110 and the second vibration device 120 according to a location of the moved virtual vibration body 130, thereby providing a user with a sensation that the virtual vibration body 130 exists vibrating in the middle of the first vibration device 110 and the second vibration device 120. In this instance, the apparatus for controlling a vibration transfer 100 may cause the user to sense that the virtual vibration body 130 vibrates in the middle rather than in motion by setting an infinitesimal distance the virtual vibration body 130 moves in the direction 610 and a distance the virtual vibration body 130 moves in the direction 620.

A variation of a vibration value according to a movement of the virtual vibration body 130 will be described with reference to FIG. 7.

The apparatus for controlling a vibration transfer 100 may clarify that the virtual vibration body 130 is placed in the middle of the first vibration device 110 and the second vibration device 120 by determining a vibration magnitude or a vibration frequency to be the same between the first vibration device 110 and the second vibration device 120, and determining a vibration timing or a vibration acceleration to be different between the first vibration device 110 and the second vibration device 120. For example, when the second vibration device 120 vibrates at the same vibration magnitude and vibration frequency as the first vibration device 110 after a period of about 0.5 seconds from a vibration of the first vibration device 110, a user may sense that the vibrating virtual vibration body 130 exists in the middle of the first vibration device 110 and the second vibration device 120.

Figure 7:
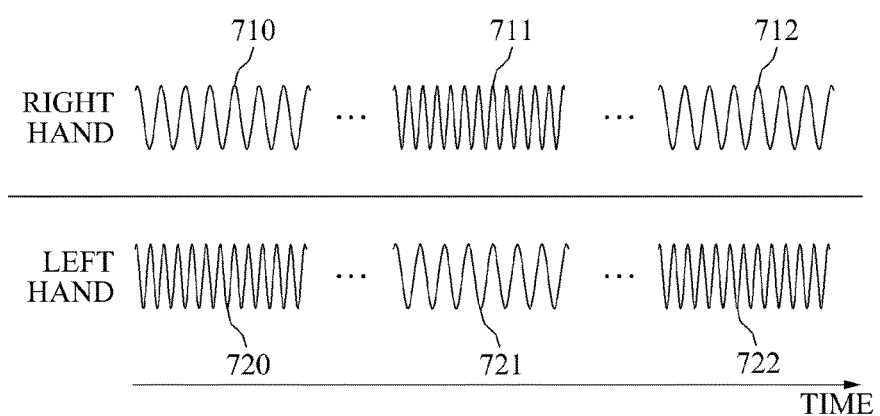
FIG. 7 illustrates an example of a method of transferring a vibration using a vibration frequency according to another embodiment.

FIG. 7 illustrates an example of a method of transferring a vibration using a vibration frequency according to an embodiment.

When the virtual vibration body 130 is placed in a middle of the first vibration device 110 and the second vibration device 120, the apparatus for controlling a vibration transfer 100 according to an embodiment may determine a vibration frequency 710 of the second vibration device 120 and a vibration frequency 720 of the first vibration device 110 to be equal to each other according to a distance between the virtual vibration body 130 and the second vibration device 120 and a distance between the virtual vibration body 130 and the first vibration device 110.

Subsequently, the apparatus for controlling a vibration transfer 100 may move the virtual vibration body 130 in the direction 610 toward the second vibration device 120, and determine a vibration frequency 711 of the second vibration device 120 and vibration frequency 721 of the first vibration device 110 according to a location of the moved virtual vibration body 130.

In this instance, a number of vibrations of the second vibration device 120 may increase since a vibration frequency is changed from the vibration frequency 710 to the vibration frequency 711, and a number of vibrations of the first vibration device 110 may decrease since a vibration frequency is changed from the vibration frequency 720 to the vibration frequency 721. Thus, a user may sense that the virtual vibration body 130 moves toward the second vibration device 120 in which a number of vibrations is increased.

Subsequently, the apparatus for controlling a vibration transfer 100 may move the virtual vibration body 130 in the direction 620 towards the first vibration device 110, and determine a vibration frequency 712 of the second vibration device 120 and vibration frequency 722 of the first vibration device 110 according to a location of the moved virtual vibration body 130.

Subsequently, a number of vibrations of the second vibration device 120 may decrease since a vibration frequency is changed from the vibration frequency 711 to the vibration frequency 712, and a number of vibrations of the first vibration device 110 may increase since a vibration frequency is changed from the vibration frequency 721 to the vibration frequency 722. Thus, a user may sense that the virtual vibration body 130 moves toward the first vibration device 110 in which a number of vibrations is increased.

The apparatus for controlling a vibration transfer 100 may provide a user with a sensation that the vibrating virtual vibration body 130 exists in the middle of the first vibration device 110 and the second vibration device 120 by periodically transmitting the vibration frequency 711 and the vibration frequency 712 to the second vibration device 120, and periodically transmitting the vibration frequency 721 and the vibration frequency 722 to the first vibration device 110.

Figure 8:
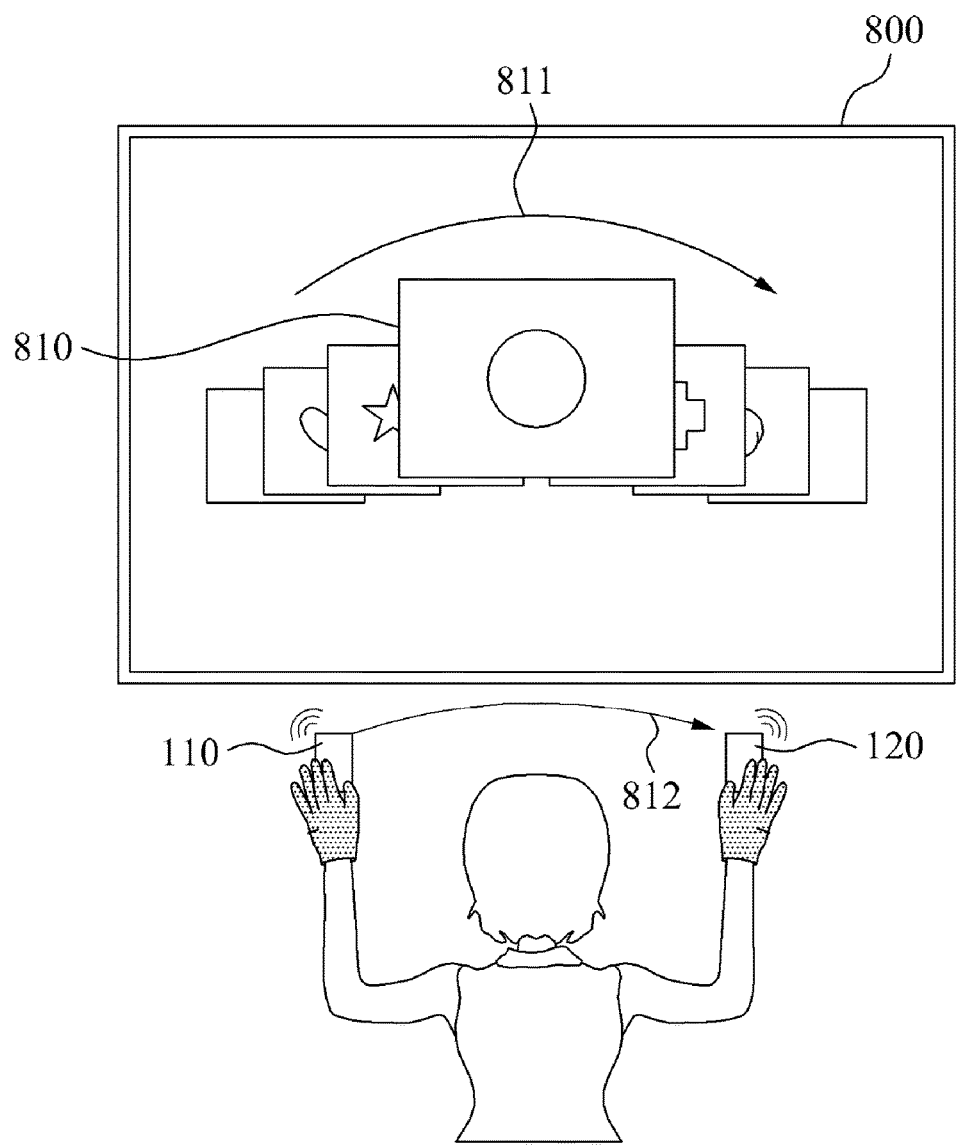
FIG. 8 illustrates another example of a method of controlling a vibration transfer according to an embodiment.

FIG. 8 illustrates another example of a method of controlling a vibration transfer according to an embodiment.

When a user having a first vibration device 110 and a second vibration device 120 selects an object 810 on a screen 800 of a terminal, and moves the selected object 810 laterally, the apparatus for controlling a vibration transfer 100 may control the first vibration device 110 and the second vibration device 120 according to a movement 811 of the object 810 on the screen 800, thereby providing the user with a sensation that a virtual vibration body moves to a right side.

In this instance, the object 810 may correspond to an object such as a menu, a folder, and a file that may be selected and moved by a user in a terminal environment.

The apparatus for controlling a vibration transfer 100 may decrease a vibration value of the first vibration device 110, and increase a vibration value of the second vibration device 120 according to the movement 811 of the object 810.

That is, when the user moves the object 810 on the screen 800, the user may sense, through the first vibration device 110 and the second vibration device 120, the virtual vibration body moving in the same direction 812 and thus, may determine a movement of the object 810 through a sense of touch in addition to a sense of sight.

FIGS. 9 through 14 illustrate examples of a vibration device according to an embodiment.

Figure 9:
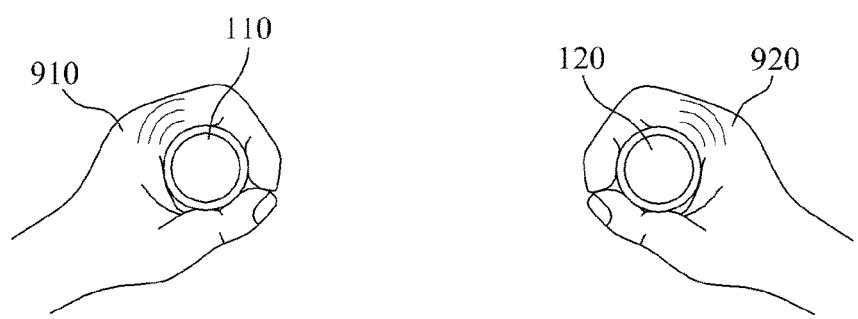
FIG. 9 illustrates an example of a vibration device in a form of a grasp according to an embodiment.

As illustrated in FIG. 9, a first vibration device 110 and a second vibration device 120 according to an embodiment may correspond to a device grasped by a user in a left hand 910 and a right hand 920.

Figure 10:
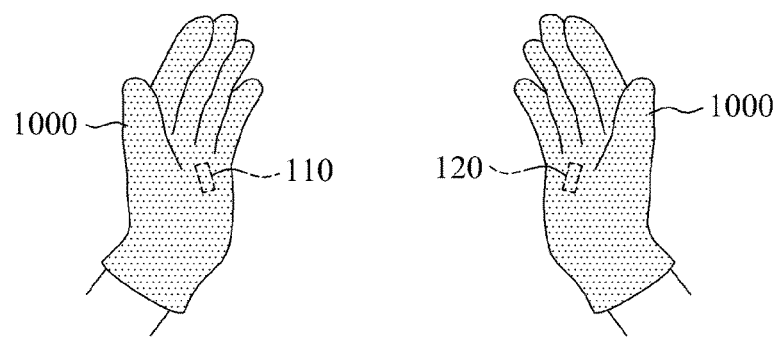
FIG. 10 illustrates an example of a vibration device in a form of gloves according to an embodiment.

As illustrated in FIG. 10, the first vibration device 110 and the second vibration device 120 may be included in gloves 1000 worn by the user.

Figure 11:
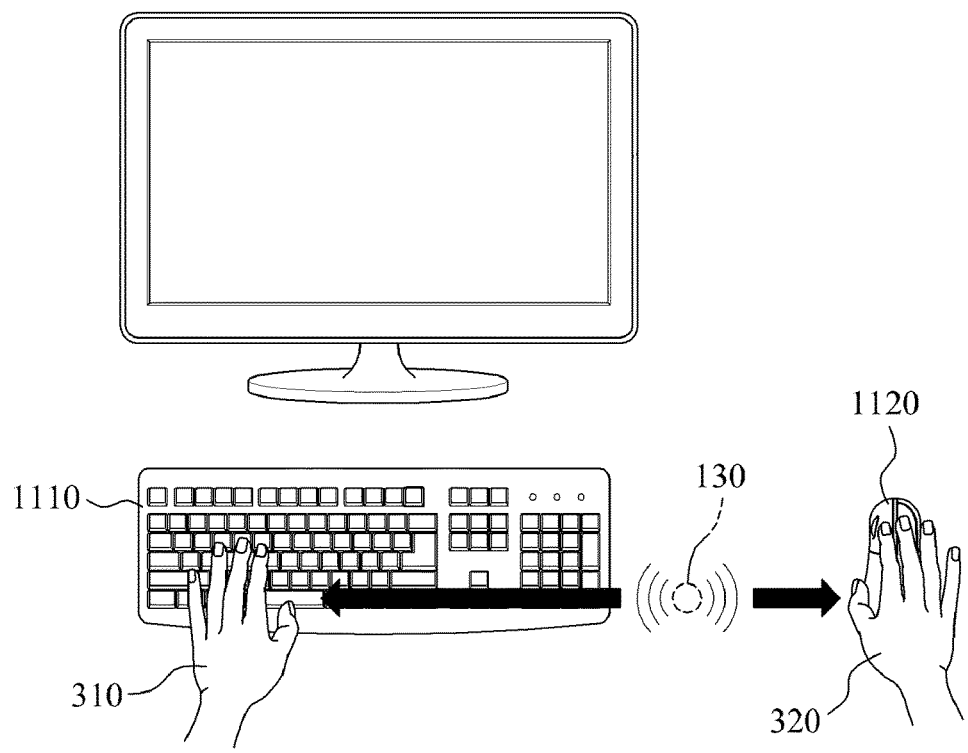
FIG. 11 illustrates an example of a vibration device in a form of a keyboard and a mouse according to an embodiment.

As illustrated in FIG. 11, the first vibration device 110 may be included in a keyboard 1110 controlled by the user using a left hand 310, and the second vibration device 120 may be included in a mouse 1120 controlled by the user using a right hand 320.

In this instance, the user may sense a vibration transfer through the keyboard 1110 and the mouse 1120 corresponding to generally used interfaces without use of a separate vibration device. That is, the apparatus for controlling a vibration transfer 100 may provide, using a vibration through the keyboard 1110 and the mouse 1120, the user with a movement of a unit or a movement of an object in a computer game using both of a keyboard and a mouse, thereby allowing the user to sense, through a sense of touch, a movement recognized by a sense of sight. When the user drags an object such as a map using the keyboard 1110 and the mouse 1120, the apparatus for controlling a vibration transfer 100 may feed back a sense of touch by changing a location of a virtual vibration body 130 according to a direction of the drag or a movement of a desired location.

Figure 12:
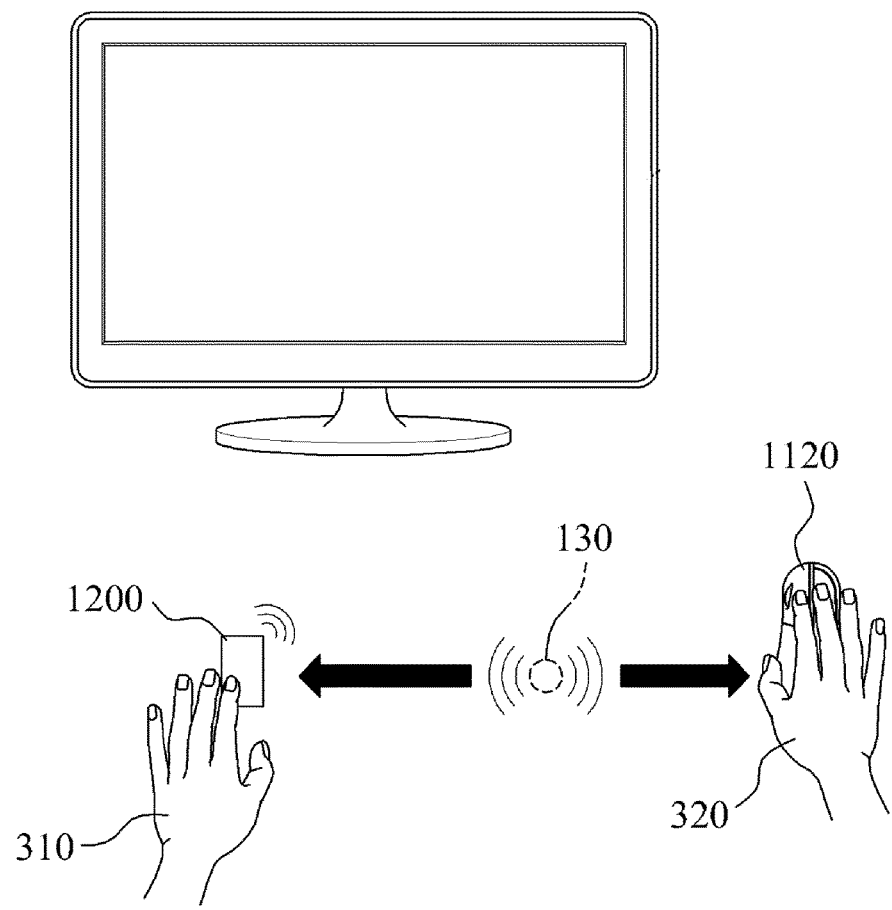
FIG. 12 illustrates an example of a vibration device in a form of a vibrator and a mouse according to an embodiment.

As illustrated in FIG. 12, when the user performs an operation using the mouse 1120 without the keyboard 1110, the first vibration device 110 may be constructed in a separate vibrator 1200 so that the user may use the vibrator 1200 in the left hand 310, thereby providing the user with a vibration transfer according to an operation of the mouse 1120.

Figure 13:
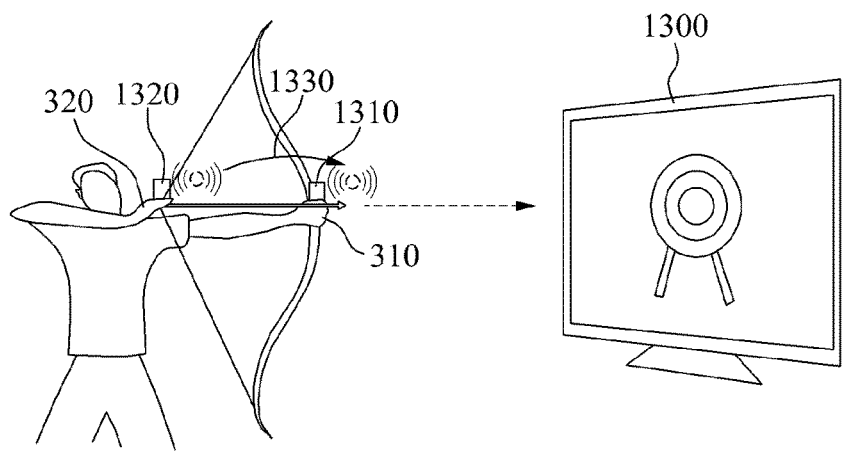
FIG. 13 illustrates an example of a vibration device in a form of a bow interface according to an embodiment.

As illustrated in FIG. 13, the first vibration device 110 and the second vibration device 120 may be included in a portion 1310 held by the left hand 310 and a portion 1320 held by the right hand 320 in a bow interface. In this instance, when the user directs the bow interface at a screen 1300, and pulls and releases the portion 1320 held by the right hand 320, the apparatus for controlling a vibration transfer 100 may decrease a vibration value of the second vibration device 120, and increase a vibration value of the first vibration device 110, thereby providing the user with a sensation that a virtual vibration body 1330 moves towards the screen 1300. In this instance, when the virtual vibration body 1330 is closer to the screen 1300 than the portion 1310 held by the left hand 310, the apparatus for controlling a vibration transfer 100 may gradually decrease a vibration value of the first vibration device 110, thereby providing the user with a sensation that the virtual vibration body 1330 moves toward the screen 1300 to be distant from the first vibration device 110.

Figure 14:
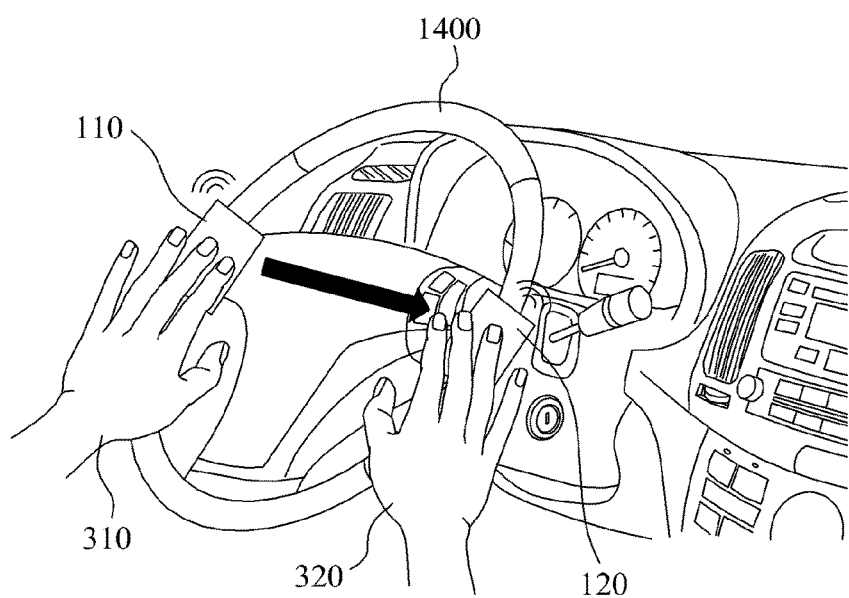
FIG. 14 illustrates an example of a vibration device in a form of a steering wheel according to an embodiment.

As illustrated in FIG. 14, the first vibration device 110 and the second vibration device 120 may be included a portion held by the left hand 310 and a portion held by the right hand 320 in a steering wheel type interface 1400 used for a steering wheel or a virtual driving simulation. In this instance, the apparatus for controlling a vibration transfer 100 may control the first vibration device 110 and the second vibration device 120 according to a movement of an object displayed on a virtual driving simulation or a movement of a real object measured using a separate camera, thereby allowing the user to sense a movement of an object when the user is distracted from focusing on a forward direction to make use of a rear-view mirror or a side-view mirror.

For example, when a vehicle cuts in from another lane abruptly, the apparatus for controlling a vibration transfer 100 identifying, through a camera, the vehicle cutting in may set a location of the identified vehicle to a location of a virtual vibration body, and move the virtual vibration body according to a direction of the vehicle cutting in, thereby allowing the user to recognize, according to a variation of a vibration, a direction in which the vehicle cuts in without viewing the forward direction.

Figure 15:
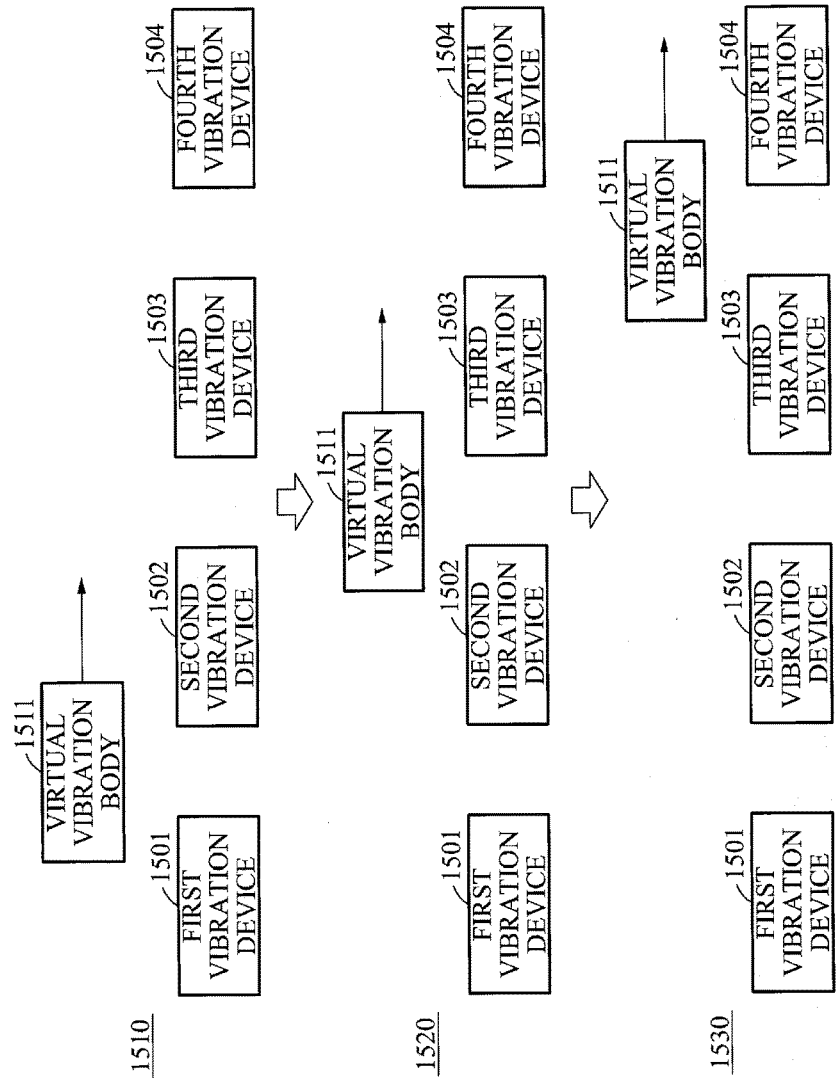
FIG. 15 illustrates a method of controlling a vibration transfer according to an embodiment when a plurality of vibration devices is included.

FIG. 15 illustrates a method of controlling a vibration transfer according to an embodiment when a plurality of vibration devices is included.

Referring to FIG. 15, the apparatus for controlling a vibration transfer 100 may provide a user with a movement of a virtual vibration body using a plurality of vibration devices.

When a virtual vibration body 1511 is placed between a first vibration device 1501 and a second vibration device 1502, which corresponds to a case 1510, the apparatus for controlling a vibration transfer 100 may determine vibration values of the first vibration device 1501 and the second vibration device 1502 to be equal to each other, and determine vibration values of a third vibration device 1503 and a fourth vibration device 1504 to be smaller than the vibration values of the first vibration device 1501 and the second vibration device 1502.

Subsequently, when the virtual vibration body 1511 moves to a location between the second vibration device 1502 and the third vibration device 1503, which corresponds to a case 1520, the apparatus for controlling a vibration transfer 100 may decrease a vibration value of the first vibration device 1501, and increase a vibration value of the third vibration device 1503, thereby providing the user with a sensation that the virtual vibration body 1511 is moving. In this instance, the apparatus for controlling a vibration transfer 100 may increase a vibration value of the second vibration device 1502 while the virtual vibration body 1511 moves toward the second vibration device 1502, and decrease the vibration value of the second vibration device 1502 from an instance the virtual vibration body 1511 passes through a location of the second vibration device 1502.

When the virtual vibration body 1511 moves to a location between the third vibration device 1503 and a fourth vibration device 1504, which corresponds to a case 1530, the apparatus for controlling a vibration transfer 100 may decrease vibration values of the first vibration device 1501 and the second vibration device 1502, and increase a vibration value of the fourth vibration device 1504, thereby providing the user with a sensation that the virtual vibration body 1511 is moving. In this instance, the apparatus for controlling a vibration transfer 100 may increase a vibration value of the third vibration device 1503 while the virtual vibration body 1511 moves towards the third vibration device 1503, and decrease the vibration value of the third vibration device 1503 from an instance the virtual vibration body 1511 passes through a location of the third vibration device 1503.

Figure 16:
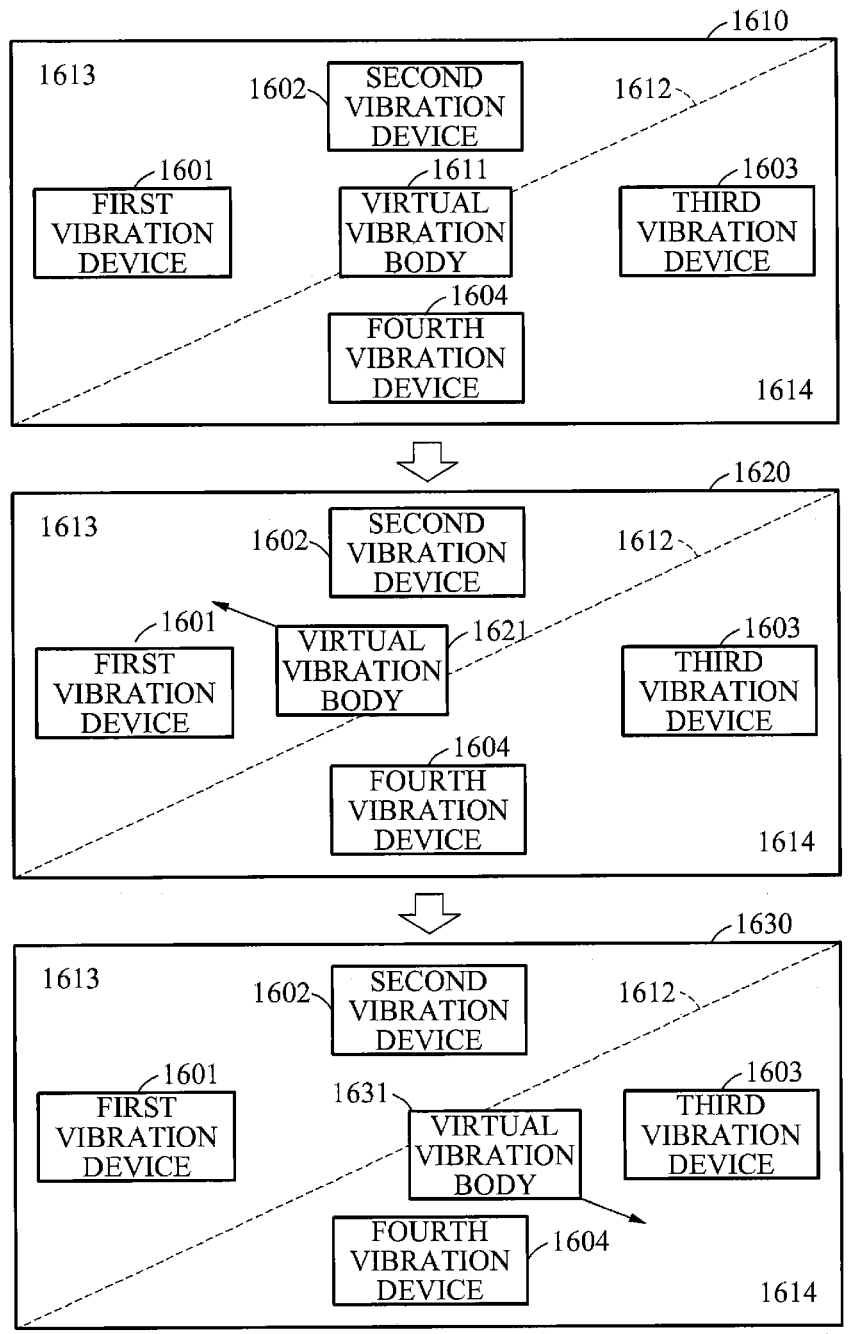
FIG. 16 illustrates a method of controlling a vibration transfer according to an embodiment when a plurality of vibration devices is included.

FIG. 16 illustrates a method of controlling a vibration transfer according to an embodiment when a plurality of vibration devices is included.

As illustrated in a box 1610, when a virtual vibration body 1611 is placed in a middle of a plurality of vibration devices including first vibration device 1601, second vibration device 1602, third vibration device 1603, and fourth vibration device 1604, the apparatus for controlling a vibration transfer 100 may set a first area 1613 and a second area 1614 based on a line 1612 passed through by the virtual vibration body 1611.

As illustrated in a box 1620, the apparatus for controlling a vibration transfer 100 may move the virtual vibration body 1611 to the first area 1613, and determine vibration values of vibration devices according to a movement of the virtual vibration body 1611. In this instance, the apparatus for controlling a vibration transfer 100 may increase vibration values of a first vibration device 1601 and a second vibration device 1602, and decrease vibration values of a third vibration device 1603 and a fourth vibration device 1604.

As illustrated in a box 1630, the apparatus for controlling a vibration transfer 100 may move the virtual vibration body 1611 to the second area 1614, and determine vibration values of vibration devices according to a movement of the virtual vibration body 1611. In this instance, the apparatus for controlling a vibration transfer 100 may decrease vibration values of the first vibration device 1601 and the second vibration device 1602, and increase vibration values of the third vibration device 1603 and the fourth vibration device 1604.

In this instance, the apparatus for controlling a vibration transfer 100 may move the virtual vibration body 1611 to a minimum distance at which a user may sense a variation of a vibration value, thereby allowing the user to sense that the virtual vibration body 1611 vibrates in a middle of the plurality of vibration devices rather than moving.

The apparatus for controlling a vibration transfer 100 may determine vibration magnitudes and vibration frequencies of the first vibration device 1601 and the second vibration device 1602 to be the same as vibration magnitudes and vibration frequencies of the third vibration device 1603 and the fourth vibration device 1604, respectively, and determine vibration timings of the first vibration device 1601 and the second vibration device 1602 to be different from vibration timings of the third vibration device 1603 and the fourth vibration device 1604, thereby allowing the user to sense that the vibrating virtual vibration body 1611 exists in a middle of the first vibration device 1601, the second vibration device 1602, the third vibration device 1603, and the fourth vibration device 1604.

For example, when the third vibration device 1603 and the fourth vibration device 1604 vibrate at the same vibration magnitude and vibration frequency as the first vibration device 1601 and the second vibration device 1602 after a period of about 0.5 seconds from vibrations of the first vibration device 1601 and the second vibration device 1602, a user may sense that the vibrating virtual vibration body 1611 exists in the middle of the first vibration device 1601, the second vibration device 1602, the third vibration device 1603, and the fourth vibration device 1604.

Figure 17:
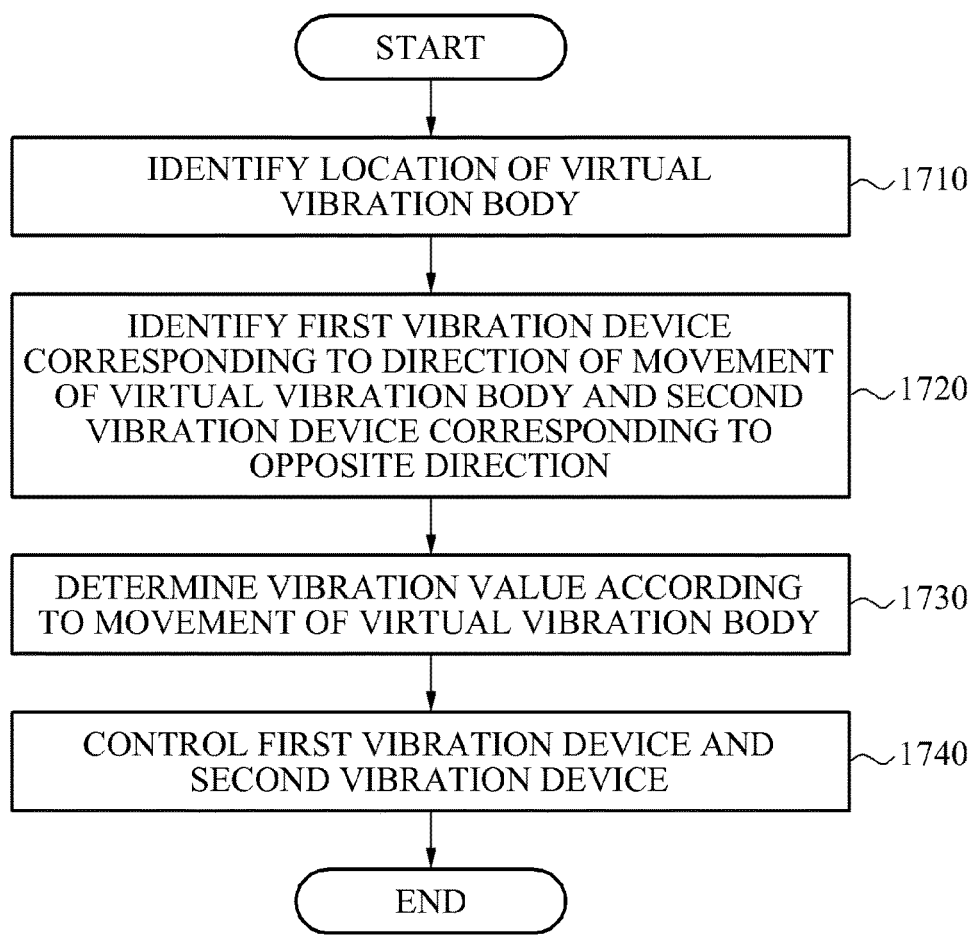
FIG. 17 illustrates a method of controlling a vibration transfer according to an embodiment.

FIG. 17 illustrates a method of controlling a vibration transfer according to an embodiment.

In operation 1710, the location identification unit 210 may identify a location of a virtual vibration body, a direction of a movement of the virtual vibration body, and a location of vibration devices.

In operation 1720, the virtual vibration body controller 220 may identify a second vibration device corresponding to the direction of a movement of the virtual vibration body and a first vibration device corresponding to a direction opposite to the direction of the movement of the virtual vibration body based on the direction of a movement of the virtual vibration body and the location of vibration devices identified in operation 1710.

In operation 1730, the vibration value determining unit 230 may determine vibration values of the first vibration device and the second vibration device identified in operation 1720 based on the direction of a movement of the virtual vibration body identified in operation 1710.

In particular, the vibration value determining unit 230 may increase a vibration value of the second vibration device corresponding to the direction of the movement of the virtual vibration body, and decrease a vibration value of the first vibration device corresponding to the direction opposite to the direction of the movement of the virtual vibration body according to an elapsed period of time.

In operation 1740, the vibration device controller 240 may control the first vibration device and the second vibration device according to the vibration values determined in operation 1730, thereby providing a user with a sense of movement of the virtual vibration body.

Figure 18:
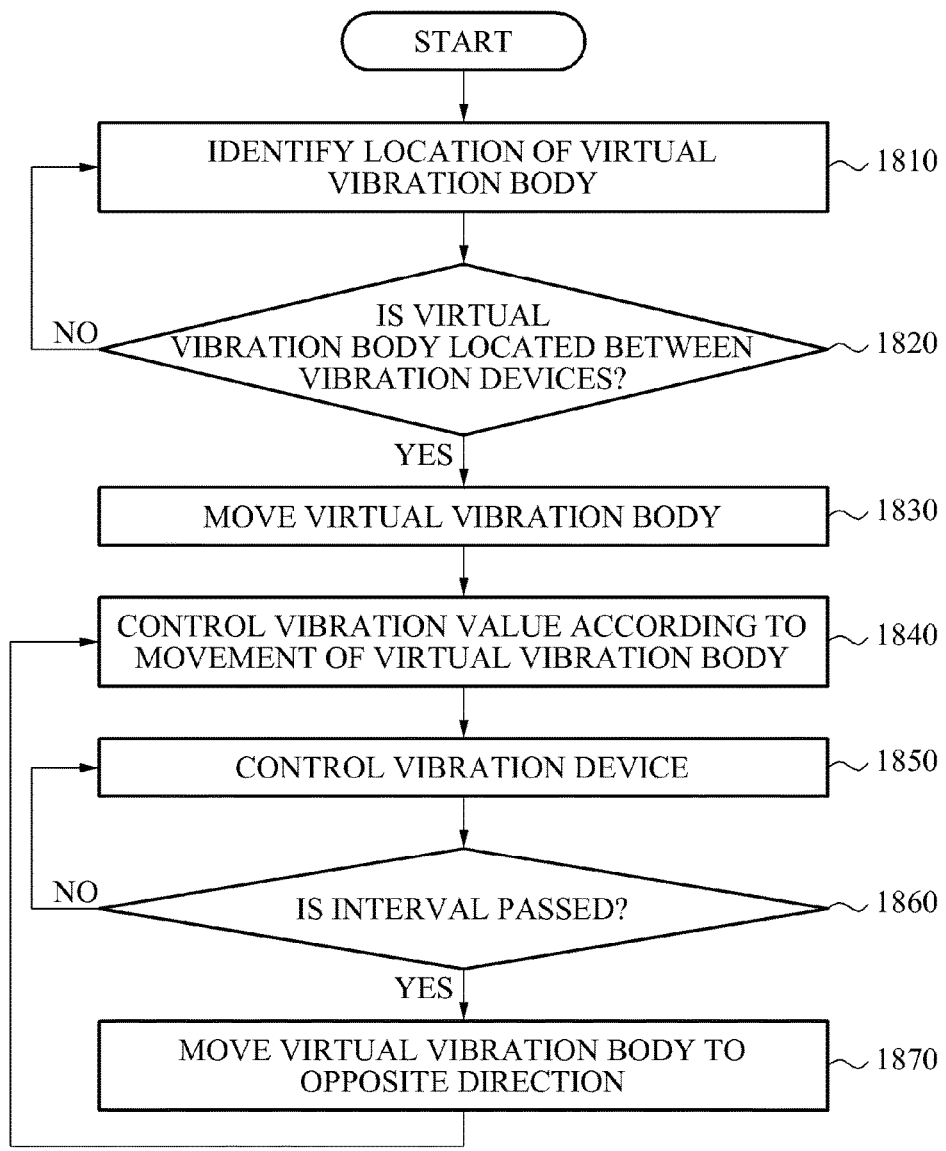
FIG. 18 illustrates a method of controlling a vibration transfer according to an embodiment.

FIG. 18 illustrates a method of controlling a vibration transfer according to an embodiment.

In operation 1810, the location identification unit 210 may identify a location of a virtual vibration body, a direction of a movement of the virtual vibration body, and a location of vibration devices.

In operation 1820, the virtual vibration body controller 220 may determine whether the location of the virtual vibration body identified in operation 1810 is located between the vibration devices, and the virtual vibration body moves.

In operation 1830, the virtual vibration body controller 220 may move the virtual vibration body when it is determined that the location of the virtual vibration body is placed between the vibration devices, and the virtual vibration body does not move. In particular, the virtual vibration body controller 220 may classify, based on the virtual vibration body, vibration devices into vibration devices placed in a first area and vibration devices placed in a second area located opposite to the first area, and move the virtual vibration body toward one of the first area or the second area.

In operation 1840, the vibration value determining unit 230 may determine, according to a location of the virtual vibration body moved in operation 1830, vibration values of the vibration devices placed in the first area and the vibration devices placed in the second devices classified in operation 1830.

In operation 1850, the vibration device controller 240 may control the vibration devices placed in the first area and the vibration devices placed in the second devices according to the vibration values determined in operation 1840.

In operation 1860, the virtual vibration body controller 220 may determine whether a predetermined interval passes.

In operation 1870, when the predetermined interval is determined to be passed in operation 1860, the virtual vibration body controller 220 may move the virtual vibration body in a direction opposite to a direction corresponding to operation 1830. When operation 1870 is performed first, the virtual vibration body controller 220 may move the virtual vibration body in a direction opposite to a direction corresponding to operation 1870.

Methods of controlling a vibration transfer according to embodiments may be recorded (stored) in one or more non-transitory computer-readable media including program instructions (computer readable instructions) to be implemented by a computer to cause one or more processors to execute or perform the program (computer readable instructions). The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. In addition, one or more non-transitory computer-readable storage media may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for controlling a vibration, the apparatus comprising:
   at least one processor; and
   a memory having instructions stored thereon executed by the at least one processor to perform:
      determining vibration values of first vibration device and second vibration device based on a direction of a movement of a virtual vibration body corresponding to a content manipulated by a user through an interface of the first vibration device or the second vibration device; and
      controlling the first vibration device and the second vibration device according to the determined vibration values,
   wherein as the virtual vibration body moves from the first vibration device to the second vibration device, vibration value of the first vibration device decreases while simultaneously increasing vibration value of the second vibration device, thereby providing a user with motion sensation of the virtual vibration body's movement,
   wherein the first vibration device and the second vibration device are apart from each other and provide vibrations on different portions of the user's body,
   wherein the content is transmitted from the first vibration device to the second vibration device by the user's control, and
   wherein, in response to the vibration values of the first vibration device and the second vibration device being substantially similar, the virtual vibration body infinitesimally oscillates periodically in directions between the second vibration device and the first vibration device.

2. The apparatus of claim 1, wherein the determining of the vibration values comprises increasing a vibration magnitude of the second vibration device corresponding to the direction of the movement of the virtual vibration body, and decreasing a vibration magnitude of the first vibration device corresponding to the direction opposite to the direction of the movement.

3. The apparatus of claim 1, wherein the determining of the vibration values comprises increasing a vibration frequency value of the second vibration device corresponding to the direction of the movement of the virtual vibration body, and decreasing a vibration frequency value of the first vibration device corresponding to the direction opposite to the direction of the movement.

4. The apparatus of claim 1, wherein the determining of the vibration values comprises increasing a vibration acceleration of the second vibration device corresponding to the direction of the movement of the virtual vibration body, and decreasing a vibration acceleration of the first vibration device corresponding to the direction opposite to the direction of the movement of the virtual vibration body.

5. The apparatus of claim 1, wherein the determining of the vibration values comprises decreasing a vibration timing interval of the second vibration device corresponding to the direction of the movement of the virtual vibration body, and increasing a vibration timing interval of the first vibration device corresponding to the direction opposite to the direction of the movement of the virtual vibration body.

6. The apparatus of claim 1, wherein the determining of the vibration values comprises determining, based on a velocity of movement of the virtual vibration body, variation velocities of a vibration value of the second vibration device and a vibration value of the first vibration device.

7. A method of controlling a vibration, the method comprising:
   determining, using at least one processor, vibration values of first vibration device and second vibration device based on a direction of a movement of a virtual vibration body corresponding to a content manipulated by a user through an interface of the first vibration device or the second vibration device; and
   controlling the first vibration device and the second vibration device according to the determined vibration values,
   wherein as the virtual vibration body moves from the first vibration device to the second vibration device, vibration value of the first vibration device decreases while simultaneously increasing vibration value of the second vibration device, thereby providing a user with motion sensation of the virtual vibration body's movement,
   wherein the first vibration device and the second vibration device are apart from each other and provide vibrations on different portions of the user's body,
   wherein the content is transmitted from the first vibration device to the second vibration device by the user's control, and
   wherein, in response to the vibration values of the first vibration device and the second vibration device being substantially similar, the virtual vibration body infinitesimally oscillates periodically in directions between the second vibration device and the first vibration device.

8. The method of claim 7, wherein the determining comprises increasing a vibration magnitude of the second vibration device corresponding to the direction of the movement of the virtual vibration body, and decreasing a vibration magnitude of the first vibration device corresponding to the direction opposite to the direction of the movement.

9. The method of claim 7, wherein the determining comprises increasing a frequency value of the second vibration device corresponding to the direction of the movement of the virtual vibration body, and decreasing a frequency value of the first vibration device corresponding to the direction opposite to the direction of the movement.

10. The method of claim 7, wherein the determining comprises increasing a vibration acceleration of the second vibration device corresponding to the direction of the movement of the virtual vibration body, and decreasing a vibration acceleration of the first vibration device corresponding to the direction opposite to the direction of the movement of the virtual vibration body.

11. The method of claim 7, wherein the determining comprises decreasing a vibration timing interval of the second vibration device corresponding to the direction of the movement of the virtual vibration body, and increasing a vibration timing interval of the first vibration device corresponding to the direction opposite to the direction of the movement of the virtual vibration body.

12. The method of claim 7, wherein the determining comprises determining, based on a velocity of movement of the virtual vibration body, variation velocities of a vibration value of the first vibration device and a vibration value of the second vibration device.

13. The method of claim 7, wherein the first vibration device and the second vibration device are grasped or worn by the user.

14. The apparatus of claim 7, wherein the determining of the vibration values comprises determining the vibration values further based on a location of the virtual vibration body, and locations of the first vibration device and second vibration device.

15. At least one non-transitory computer-readable medium storing computer readable instructions that control at least one processor to implement the method of claim 7.

16. The apparatus of claim 1, wherein the first vibration device and the second vibration device are grasped or worn by the user.

17. An apparatus for controlling a vibration, the apparatus comprising:

at least one processor; and a memory having instructions stored thereon executed by the at least one processor to perform:

determining vibration values of first vibration device and second vibration device based on a direction of a movement of a virtual vibration body corresponding to a content manipulated by a user through an interface of the first vibration device or the second vibration device; and controlling the first vibration device and the second vibration device according to the determined vibration values, wherein as the virtual vibration body moves from the first vibration device to the second vibration device, vibration value of the first vibration device decreases while simultaneously increasing vibration value of the second vibration device, thereby providing a user with motion sensation of the virtual vibration body's movement, and wherein, in response to the vibration values of the first vibration device and the second vibration device being substantially similar, the virtual vibration body infinitesimally oscillates periodically in directions between the second vibration device and the first vibration device.

* * * * *